(12) United States Patent
Velger

(10) Patent No.: US 11,284,680 B2
(45) Date of Patent: Mar. 29, 2022

(54) FLEXIBLE INTERLOCKING CLOSURE

(71) Applicant: Tyler Velger, Harrison Township, MI (US)

(72) Inventor: Tyler Velger, Harrison Township, MI (US)

( * ) Notice: Subject to any disclaimer, the term of this patent is extended or adjusted under 35 U.S.C. 154(b) by 0 days.

(21) Appl. No.: 16/369,603

(22) Filed: Mar. 29, 2019

(65) Prior Publication Data

US 2019/0298007 A1 Oct. 3, 2019

Related U.S. Application Data

(60) Provisional application No. 62/650,983, filed on Mar. 30, 2018.

(51) Int. Cl.
| | | |
|---|---|---|
| *A42B 1/22* | (2006.01) | |
| *A41D 27/00* | (2006.01) | |
| *A44B 11/25* | (2006.01) | |
| *B29L 5/00* | (2006.01) | |
| *A42B 1/02* | (2006.01) | |

(Continued)

(52) U.S. Cl.
CPC .......... *A44B 11/2592* (2013.01); *A41D 27/00* (2013.01); *A42B 1/02* (2013.01); *A42B 1/22* (2013.01); *A44C 5/0053* (2013.01); *A44C 5/2076* (2013.01); *A41D 2300/322* (2013.01); *B29C 45/2628* (2013.01); *B29K 2101/12* (2013.01); *B29L 2005/00* (2013.01)

(58) Field of Classification Search
CPC .. A42B 1/22; A42B 1/225; A42B 1/02; A42B 3/08; A42B 1/045; A42B 7/00; A44B 11/2592; A44B 11/2584; A44B 19/16; A44B 19/267; A44B 19/384; A44B 19/38; A44B 11/258; A44B 19/42; A44C 5/0053; A44C 5/2076; A44C 5/2071; A44C 5/2066; A44C 5/00; A44C 27/00; A41D 2300/322; A41D 13/0568; A41D 20/00; A41D 2200/10; A41D 2300/30; A41D 2300/33; A41D 27/00; A41F 1/008; A41F 9/002; A41F 9/02; A41F 9/025; A41F 1/00; A41F 9/00; A44D 2200/10; A44D 2200/00; A61F 9/027; B29C 45/2628; B29C 45/0017; B29C 2045/0091; B29C 2045/0093; B29C 45/2624; B29C 45/26; B29C 45/2626; B29K 2101/12; B29L 2005/00
USPC ......... 2/195.4, 195.2, 452; 24/585.11, 585.1, 24/585.12, 17 AP, 16 PB; 224/164, 175, 224/267
See application file for complete search history.

(56) References Cited

U.S. PATENT DOCUMENTS

| | | | | |
|---|---|---|---|---|
| 1,461,623 A | * | 7/1923 | Lebow ..................... | A42B 1/22 2/195.2 |
| 1,593,452 A | * | 7/1926 | Hertzman ................ | A42B 1/22 24/592.1 |

(Continued)

FOREIGN PATENT DOCUMENTS

| | | | | |
|---|---|---|---|---|
| CH | 402485 A | * | 11/1965 | ........... A44C 5/0069 |
| JP | 10245067 A | * | 9/1998 | ........... A44C 5/0069 |
| KR | 101462450 B1 | * | 11/2014 | |

*Primary Examiner* — Amy Vanatta
(74) *Attorney, Agent, or Firm* — Christopher P. Maiorana, P.C.

(57) ABSTRACT

An apparatus includes a first portion and a second portion. The first portion generally comprises a channel feature. The second portion generally comprises a rib feature. The rib feature is generally configured to fit within the channel feature.

19 Claims, 9 Drawing Sheets

(51) Int. Cl.
*A44C 5/00* (2006.01)
*A44C 5/20* (2006.01)
*B29C 45/26* (2006.01)
*B29K 101/12* (2006.01)

(56) References Cited

U.S. PATENT DOCUMENTS

| | | | | |
|---|---|---|---|---|
| 1,709,181 | A * | 4/1929 | Matlock | A42B 1/22 |
| | | | | 24/595.1 |
| 2,684,484 | A * | 7/1954 | Rossman | A42B 1/22 |
| | | | | 2/195.4 |
| 2,684,485 | A * | 7/1954 | Rossman | A42B 1/22 |
| | | | | 2/195.2 |
| 2,940,149 | A * | 6/1960 | O'Connor | A41F 11/02 |
| | | | | 24/585.1 |
| 2,975,496 | A * | 3/1961 | McGraw | A44B 19/16 |
| | | | | 24/585.1 |
| 3,058,187 | A * | 10/1962 | Gugen | A41F 1/00 |
| | | | | 24/585.11 |
| 3,263,292 | A * | 8/1966 | Fekete | A42B 1/22 |
| | | | | 24/595.1 |
| 3,355,771 | A * | 12/1967 | Alberts | B29D 5/00 |
| | | | | 425/122 |
| 3,518,727 | A * | 7/1970 | Eberle | F16L 3/233 |
| | | | | 24/16 PB |
| 4,178,751 | A * | 12/1979 | Liautaud | A44C 5/0053 |
| | | | | 224/175 |
| 4,976,017 | A * | 12/1990 | Frano | A41F 1/008 |
| | | | | 24/578.1 |
| 5,402,538 | A | 4/1995 | Conrad | 2/195.2 |
| 5,428,843 | A | 7/1995 | Clowers et al. | 2/195.2 |
| 5,499,402 | A | 3/1996 | Rose | 2/209.13 |
| 5,509,145 | A | 4/1996 | Stevenson et al. | 2/195.1 |
| 5,584,076 | A | 12/1996 | Armstrong | 2/195.2 |
| 5,600,854 | A | 2/1997 | Henrekin | 2/195.2 |
| 6,941,581 | B1 | 9/2005 | England et al. | 2/195.2 |
| 7,039,958 | B2 | 5/2006 | Henricksen | 2/238 |
| 8,096,022 | B2 * | 1/2012 | Hui | B65D 33/2591 |
| | | | | 24/30.5 R |
| 8,127,379 | B2 * | 3/2012 | Hardee | A47H 2/00 |
| | | | | 5/493 |
| 8,650,665 | B2 * | 2/2014 | Shirai | A41F 1/008 |
| | | | | 2/183 |
| 10,238,185 | B1 * | 3/2019 | Ong | A44B 17/0023 |
| 2004/0060099 | A1 * | 4/2004 | Park | A42B 1/22 |
| | | | | 2/195.4 |
| 2007/0098304 | A1 * | 5/2007 | May | B65D 33/2508 |
| | | | | 383/63 |
| 2008/0134414 | A1 * | 6/2008 | Cho | A44B 11/008 |
| | | | | 2/183 |
| 2009/0158497 | A1 * | 6/2009 | Gober | A41D 19/0075 |
| | | | | 2/161.6 |
| 2010/0281661 | A1 * | 11/2010 | Harada | A42B 1/22 |
| | | | | 24/593.11 |
| 2017/0079362 | A1 * | 3/2017 | Olcese | B29C 45/14336 |
| 2017/0188669 | A1 * | 7/2017 | Dukerschein | A44B 11/20 |
| 2018/0153241 | A1 * | 6/2018 | Cho | A42B 1/24 |
| 2018/0184767 | A1 * | 7/2018 | Oike | A44B 19/16 |
| 2019/0365061 | A1 * | 12/2019 | Martin | A44C 5/0053 |

* cited by examiner

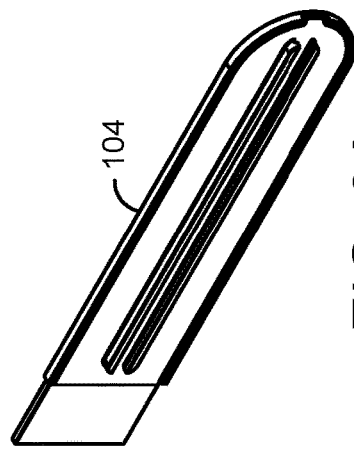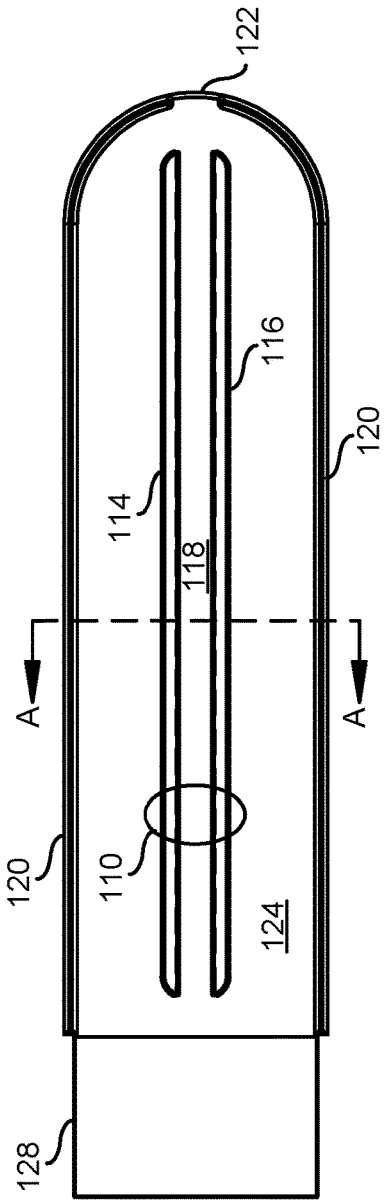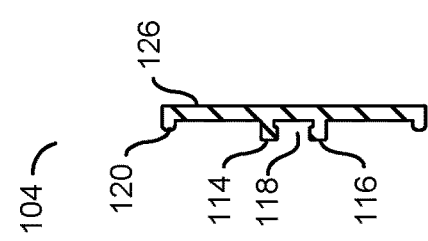

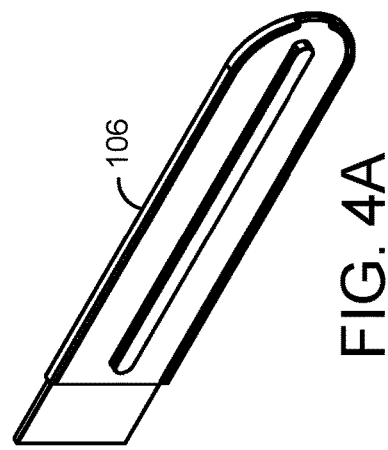
FIG. 4A
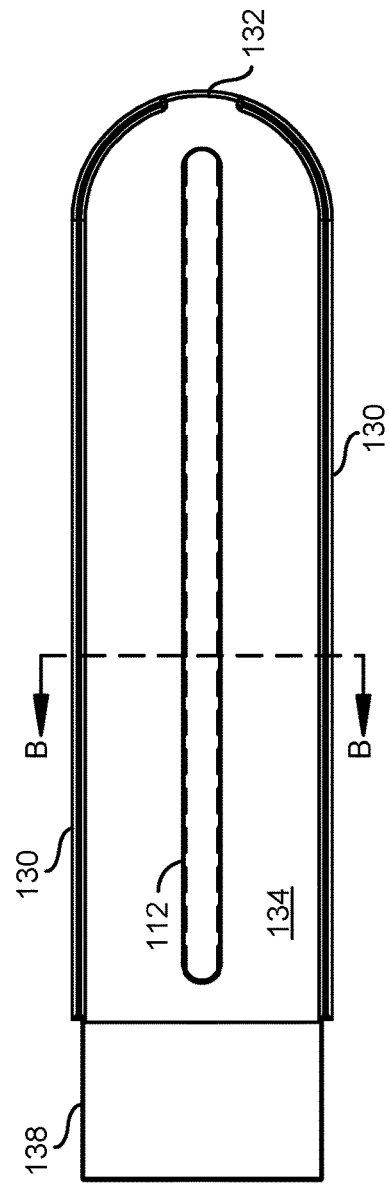
FIG. 4B
FIG. 4C
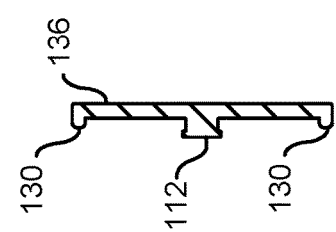
SECTION B-B
FIG. 4D

FLEXIBLE INTERLOCKING CLOSURE

This application relates to U.S. Provisional Application No. 62/650,983, filed Mar. 30, 2018, which is hereby incorporated by reference in its entirety.

FIELD OF THE INVENTION

The invention relates to adjustable clothing fasteners generally and, more particularly, to a method and/or apparatus for implementing a flexible interlocking closure.

BACKGROUND

Existing adjustable caps include two straps that connect together to adjust a size of the cap. Adjustment is generally implemented through a hook and loop fastener, a leather or cloth strap and buckle fastener, or two plastic straps that are connectable at different sizes or lengths through a plurality of holes. In the latter, the holes are spaced apart a distance corresponding to an incremental adjustable circumference distance, and a corresponding plurality of plastic rivets, which are engageable with the holes and which are correspondingly spaced to the incremental adjustable circumference distance. The hook and loop fastener can catch on a wearer's hair and can be difficult to adjust. The existing methods do not provide a clean smooth appearance.

It would be desirable to implement a flexible interlocking closure.

SUMMARY

The invention concerns an apparatus comprising a first portion and a second portion. The first portion generally comprises a first side having a smooth surface and a second side having a channel feature. The second portion generally comprises a first side having a smooth surface and a second side having a rib feature. The rib feature is generally configured to fit within the channel feature.

BRIEF DESCRIPTION OF THE FIGURES

Embodiments of the invention will be apparent from the following detailed description and the appended claims and drawings in which:

FIGS. 3A-3D are diagrams illustrating a first portion of the flexible interlocking closure of FIG. 1.

FIGS. 4A-4D are diagrams illustrating a second portion of the flexible interlocking closure of FIG. 1.

DETAILED DESCRIPTION OF THE EMBODIMENTS

Embodiments of the present invention include providing a flexible interlocking closure that may (i) provide a smooth appearance, (ii) be easily adjusted, (iii) provide infinite adjustment over a predetermined range, (iv) provide engagement over a full length of the closure, (v) be implemented as an adjustable watchband, (vi) be implemented as an adjustable band or strap on a cap or hat, and/or (vii) be implemented in place of buttons, a zipper, or a hook and loop fastener on a variety of clothing items.

Figure 1:
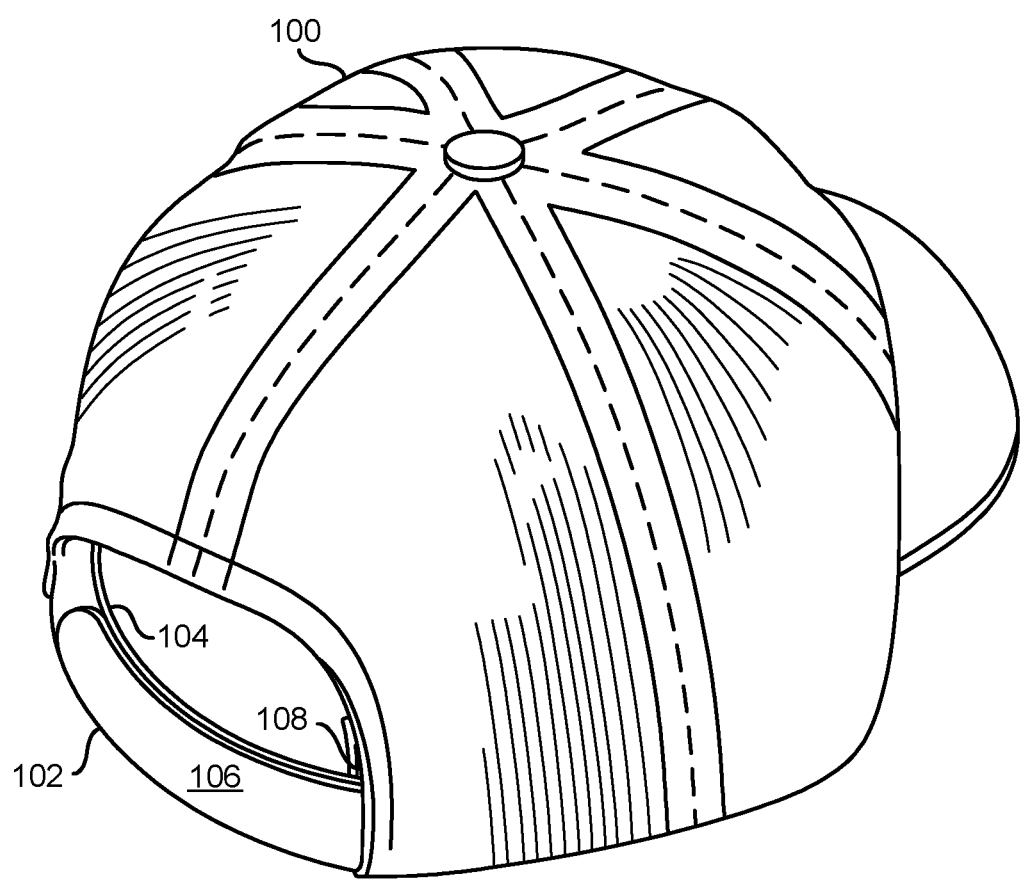
FIG. 1 is a diagram of a cap with a flexible interlocking closure in accordance with an example embodiment of the invention.
Figure 2A:
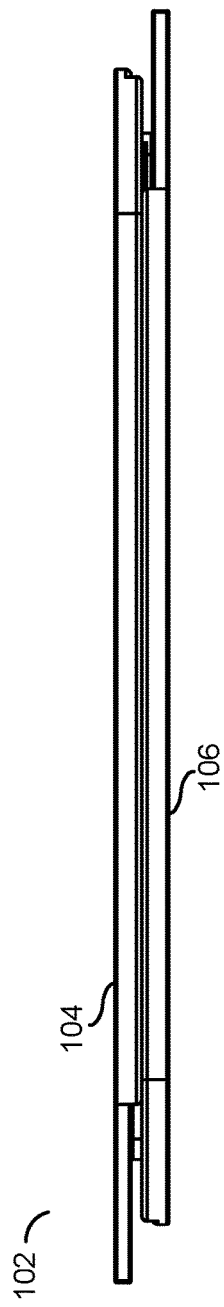
FIGS. 2A-2D are diagrams illustrating various views of a flexible interlocking closure in accordance with an example embodiment of the invention.
Figure 2B:
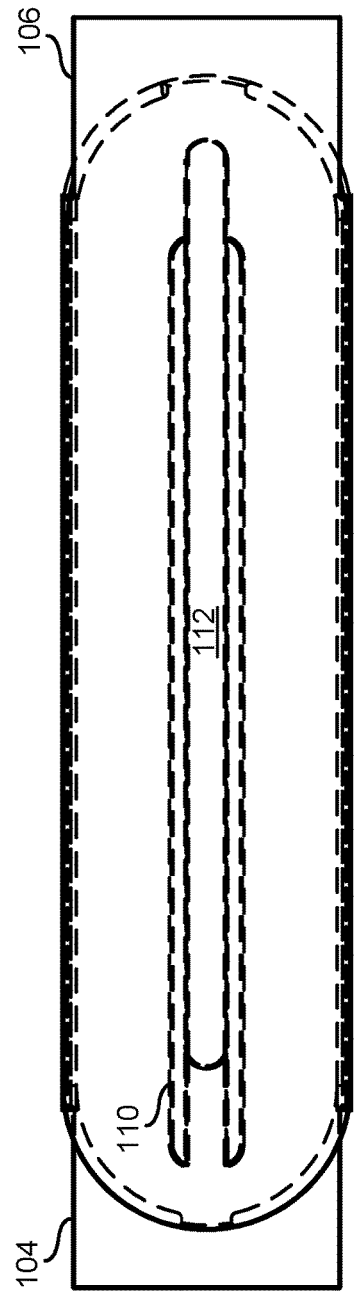
Figure 2C:
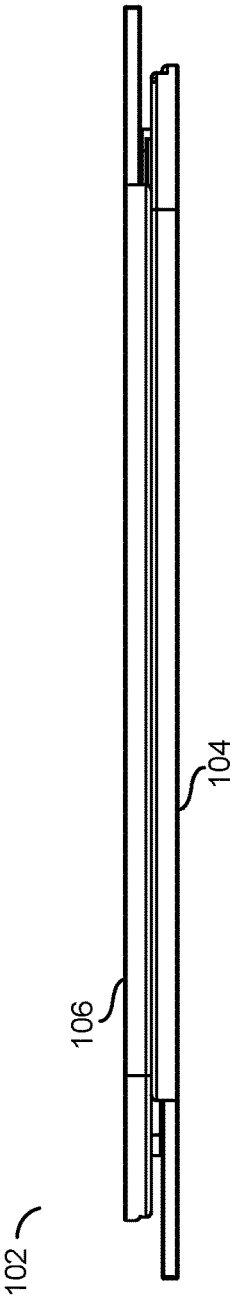
Figure 2D:
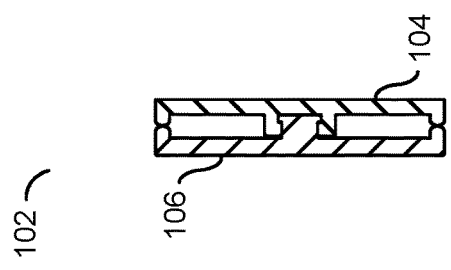

Referring to FIG. 1, a diagram of a hat (or cap) 100 is shown with a flexible interlocking closure in accordance with an example embodiment of the invention. In an example, the cap 100 may be implemented as an adjustable cap. The cap 100 may have a band (or strap) 102. The strap 102 generally comprises a flexible interlocking closure in accordance with an example embodiment of the invention. The strap 102 generally allows the cap 100 to be adjusted over a continuous range of hat sizes. In various embodiments, the strap 102 generally provides a continuously variable circumference for fitting the cap 100 to any head size.

In an example, the strap 102 may comprise a first (or inner) portion 104 and a second (or outer) portion 106. The first portion 104 and the second portion 106 generally comprise features allowing the two portions to snap and/or slide together. When the two portions 104 and 106 are snapped or slid together, the strap 102 presents an inner surface and an outer surface that are substantially smooth in appearance. In some embodiments, the ends of the two portions 104 and 106 may be visible. In some embodiments, the ends of the portions 104 and 106 may be semi-circular. In some embodiments, the ends of the portions 104 and 106 may be square with round corners. However, other shapes may be implemented to meet design criteria of a particular implementation. In some embodiments, the cap 100 may be configured such that the ends of the portions 104 and 106 are enclosed within the cap 100 over the entire range of adjustment. In an example, the material of the cap 100 may be folded over to create pockets 108 into which the ends of the portions 104 and 106 extend and are enclosed (or hidden from view).

In various embodiments, a first end of the first portion 104 may be attached (e.g., stitched, glued, etc.) to one side of an opening (or gap) in a clothing item (e.g., the cap 100) and a first end of the second portion 106 may be attached (e.g., stitched, glued, etc.) to another side of the opening (or gap) in the clothing item. The portions 104 and 106 may be fastened together (interlocked) to connect the two sides of the opening. For example, in the cap 100 the portions 104 and 106 may be fastened together (interlocked) to form a hatband with a circumference of continuously variable size over a predetermined range. In some embodiments, the clothing item may be configured to enclose a second end of the first portion 104 and a second end of the second portion 106 to provide a continuous smooth appearance of the strap 102 between the two sides of the opening in the clothing item. For example, a headband portion of the cap 100 may be formed (folded) to provide respective pockets 108 within which the first end of each of the portions 104 and 106 may be attached to the cap material and the second end of each portion 104 and 106 may be hidden from view while slidably engaging one another.

In various embodiments, the portions 104 and 106 may comprise a plastic (or polymer) material. In various embodiments, the plastic (or polymer) material may include, but is not limited to, polyamide (NYLON), polyester, polybutylene terephthalate (PBT), polypropylene, and polyethylene terephthalate (PET), and/or various alloys and/or fillers of these resins. In various embodiments, the portions 104 and 106 may be formed using various techniques including, but not limited to, casting, injection-molding, and three-dimensional printing. In an example, the portions 104 and 106 may be molded in a single step (e.g., formed side by side or end to end using a mold in an injection molding machine, etc.).

Referring to FIGS. 2A-2D, diagrams are shown illustrating a top view (FIG. 2A), a plan view (FIG. 2 B), a bottom view (FIG. 2C), and a cross-sectional view (FIG. 2D) of a flexible interlocking closure 102 in accordance with an example embodiment of the invention. In an example, the flexible interlocking closure 102 is shown with the portion 104 and the portion 106 engaged with one another. In an example, the portion 104 may have a channel feature 110 and the portion 106 may have a rib feature 112. The rib feature 112 is generally configured to fit securely (snugly) within the channel feature 110. In another example, the portion 104 may have the rib feature 112 and the portion 106 may have the channel feature 110.

In various embodiments, the channel feature 110 and the rib feature 112 may have cross-sections configured to interlock when assembled. In an example, the channel feature 110 and the rib feature 112 may have a dovetail cross-section. In another example, the channel feature 110 and the rib feature 112 may have a mushroom-shaped cross-section. In still another example, the channel feature 110 and the rib feature 112 may have a somewhat hourglass-shaped cross-section. The portions 104 and 106 are generally made of material with sufficient compliance (flexibility) to allow the rib feature 112 to be pressed into the channel feature 110 and interlock (e.g., a snapfit) with the channel feature 110. For example, walls of the channel feature 110 may be able to flex as the rib feature 112 is being inserted (e.g., pressed in) and rebound back to engage the rib feature 112 without incurring any permanent distortion or deformation.

In various embodiments, the interlocking features of the two portions 104 and 106 generally allow the portions 104 and 106 to be slid relative to one another yet hold a set position, allowing the assembled closure (or apparatus) to function as a continuously variable length band (or closure). In some embodiments, the rib feature 112 and the channel feature 110 may include breaks (or interruptions or gaps) that enable the portions 104 and 106 to have greater flexibility than when the rib and channel features are solid for their entire length. When the portions 104 and 106 are assembled, the channel feature 110 and the rib feature 112 are generally enclosed within the assembled apparatus. Because the channel feature 110 and the rib feature 112 are enclosed, the flexible interlocking closure 102 generally provides a substantially smooth appearance to both the inside surface of the hat band and the outside surface of the hat band.

Referring to FIGS. 3A-3D, diagrams are shown illustrating a perspective view (FIG. 3A), a plan view (FIG. 3B), an edge view (FIG. 3C), and a cross-sectional view (FIG. 3D) of an example implementation of the portion 104 of the flexible interlocking closure 102 in accordance with an example embodiment of the invention. In an example, the portion 104 may be implemented having the channel feature 110. In various embodiments, the channel feature 110 may comprise a first wall 114 and a second wall 116. The walls 114 and 116 generally define a space (or void) 118 between the walls 114 and 116 into which the rib feature 112 may fit. In an example, the space 118 defined by the walls 114 and 116 of the channel feature 110 may have a dovetail, a mushroom, or a somewhat hourglass cross-section. A section A-A is shown illustrating a cross-section of the portion 104 and the channel 110 where the space 118 is mushroom (or T) shaped.

In various embodiments, the portion 104 may further comprise a wall (or lip) 120 running around a substantial portion of a periphery of the portion 104. In some embodiments, the lip 120 does not extend to one end (e.g., an end 128) of the portion 104. In embodiments where the lip 120 does not extend to one end, the end to which the lip 120 does not extend may be used to attach the portion 104 to an article of clothing (e.g., a hat, baseball cap, etc.). The lip 120 is generally lower in height relative to the walls 114 and 116. The lip 120 is generally configured to cooperate in conjunction with a similar lip feature of the portion 106 to enclose the channel feature 110 and the rib feature 112 when engaged with one another. In various embodiments, the lip 120 comprises an opening (or gap) 122 configured to allow the rib feature 112 of the portion 106 to pass through when the two portions 104 and 106 are engaged and sliding relative to one another. In some embodiments, the walls 114 and 116 may extend from the opening 122 to the end 128.

In general, the portion 104 has a first surface 124 and a second surface 126. The surfaces 124 and 126 are generally smooth in appearance. In various embodiments, the walls 114 and 116, and the lip 120 extend perpendicularly away from the surface 124. A height of walls 114 and 116 relative to the surface 124 is generally greater than a height of the lip 120 relative to the surface 124. In an example, the height of lip 120 may be about one half of the height of the walls 114 and 116. In an example, the end 128 may be thinner than a remainder of the portion 104. In an example, a surface of the end 128 may be lower than the surface 124.

Referring to FIGS. 4A-4D, diagrams are shown illustrating a perspective view (FIG. 4A), a plan view (FIG. 4B), an edge view (FIG. 4C), and a cross-sectional view (FIG. 4D) of an example implementation of the second portion 106 of the flexible interlocking closure 102 in accordance with an example embodiment of the invention. In an example, the portion 106 may be implemented having the rib (or tenon) feature 112. In various embodiments, the rib feature 112 may comprise a cross-section have a dovetail, mushroom, or somewhat hourglass shape. The cross-section of the rib feature 112 is generally configured to match the cross-section of the space 118 within the channel feature 110 (described above in connection with FIG. 3). A section B-B is shown illustrating an example cross-section of the portion 106 and the rib feature 112, where the rib feature 112 is mushroom (or T) shaped.

In various embodiments, the portion 106 may further comprise a wall (or lip) 130 running around a substantial portion of a periphery of the portion 106. In some embodiments, the lip 130 does not extend to one end (e.g., an end 138) of the portion 106. In embodiments where the lip 130 does not extend to one end, the end to which the lip 130 does not extend may be used to attach the portion 106 to an article of clothing (e.g., a hat, sports cap, baseball cap, etc.). The lip 130 is generally lower in height relative to the rib feature 112. The lip 130 is generally configured to cooperate in conjunction with the lip 120 of the portion 104 to enclose the channel feature 110 and the rib feature 112 when engaged with one another. In various embodiments, the lip 130 comprises an opening (or gap) 132 configured to allow the channel feature of the portion 106 to pass through when the two portions 104 and 106 are engaged and sliding relative to one another.

In general, the portion 106 has a first surface 134 and a second surface 136. The surfaces 134 and 136 are generally smooth in appearance. In various embodiments, the rib feature 112 and the lip 130 extend perpendicularly away from the surface 134. The height of rib feature 112 relative to the surface 134 is generally greater than the height of the lip 130 relative to the surface 134. In an example, the height of lip 130 may be about one half of the height of the rib feature 112. In an example, the end 138 may be thinner than a remainder of the portion 106. In an example, a surface of the end 138 may be lower than the surface 134.

Figure 5:
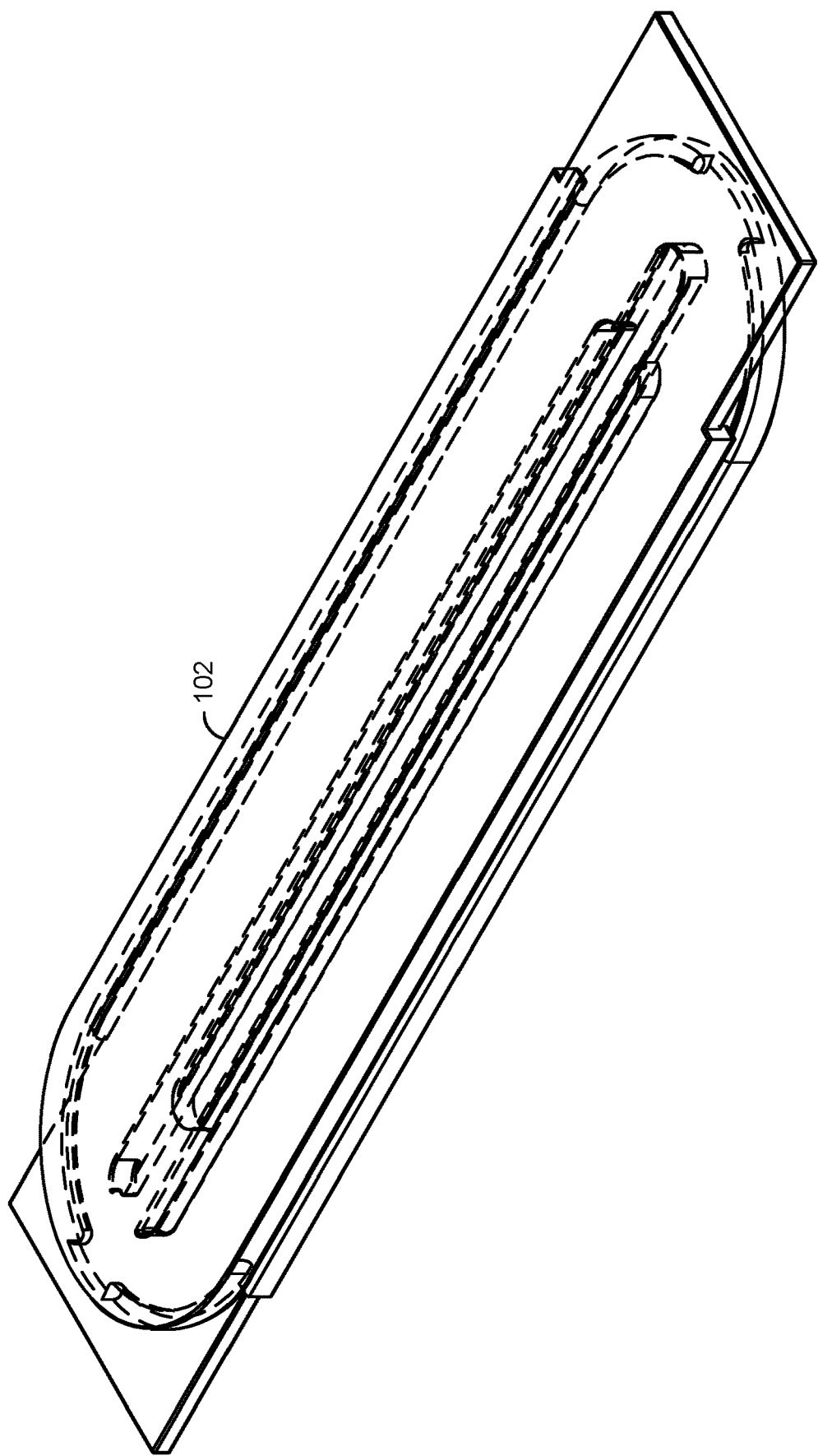
FIG. 5 is a diagram illustrating a perspective view of an assembled flexible interlocking closure in accordance with an example embodiment of the invention.

Referring to FIG. 5, a diagram is shown illustrating a perspective view of the flexible interlocking closure 102 in accordance with an example embodiment of the invention. As would be apparent to a person of ordinary skill, when the portions 104 and 106 are assembled to form the flexible interlocking closure 102, the portion 104 and 106 may be slid with respect to one another to expand or contract an overall length of the closure 102. The contraction and expansion are generally continuously adjustable over the range of engagement of the two portions 104 and 106. In some embodiments, the channel feature 110 and rib feature 112 may have a rough (or toothed) surface to provide increased sliding resistance (or friction), which needs to be overcome when performing the adjustment. In an example, depending upon the material and/or the design, some threshold force (e.g., about a pound, etc.) may need to be applied to start the portions 104 and 106 sliding relative to each other when fully engaged.

Figure 6A:
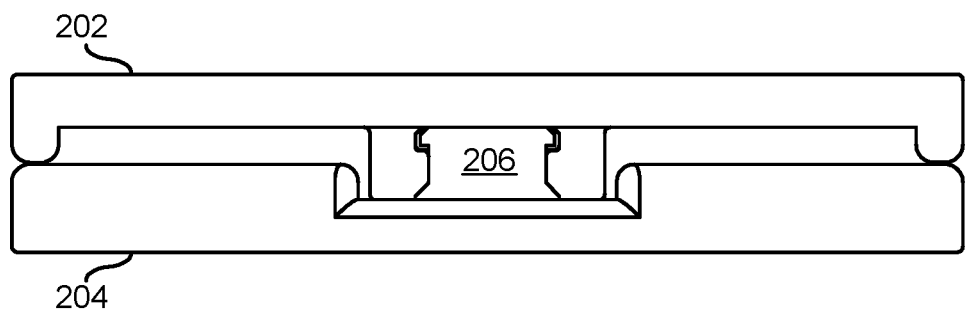
FIG. 6A and FIG. 6D are diagrams illustrating cross-sectional views of flexible interlocking closures in accordance with another example embodiment of the invention.

Referring to FIG. 6A, a diagram is shown illustrating an end view of an example implementation of a flexible interlocking closure in accordance with example embodiments of the invention. In an example, a flexible interlocking closure 200 may comprise a portion 202 and a portion 204. The portion 204 may include a rib feature 206. The portion 202 may include a channel feature configured to mate with the rib feature 206. The rib feature 206 and a space defined by walls of the channel feature of the portion 202 generally have a somewhat hourglass shape. In an example, the top of the rib feature 206 may be mushroom-shaped while a bottom of the rib feature 206, where the rib feature 206 is attached to the portion 204, may be flared out to provide greater contact area with the channel walls and/or greater strength. In an example, the bottom of the rib feature 206 may flare out (e.g., at a 45 degrees angle).

Figure 6B:
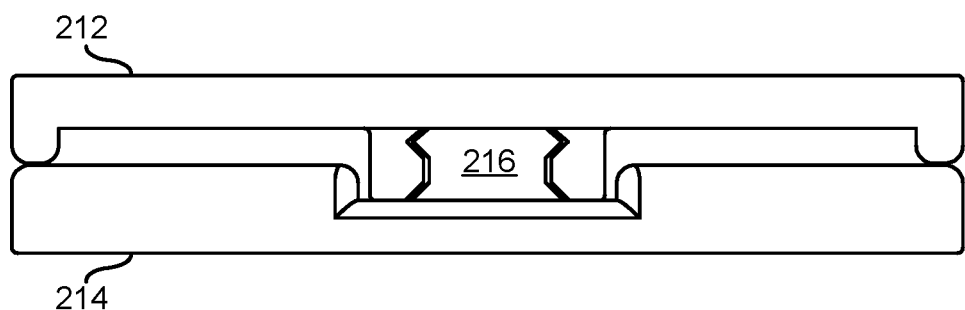

Referring to FIG. 6B, a diagram is shown illustrating an end view of an example implementation of a flexible interlocking closure in accordance with example embodiments of the invention. In another example, a flexible interlocking closure 210 may comprise a portion 212 and a portion 214. The portion 214 may include a rib feature 216. The portion 212 may include a channel feature configured to mate with the rib feature 216. The rib feature 216 and a space defined by walls of the channel feature of the portion 212 generally have a somewhat hourglass shape. In an example, the top of the rib feature 216 may have triangularly shaped edges on both sides while a bottom of the rib feature 216, where the rib feature 216 is attached to the portion 214, may be flared out to provide greater contact area with the channel walls and/or greater strength. In an example, the top edges and the bottom of the rib feature 216 may be similarly angled (e.g., at a 45 degrees angle).

Figure 7:
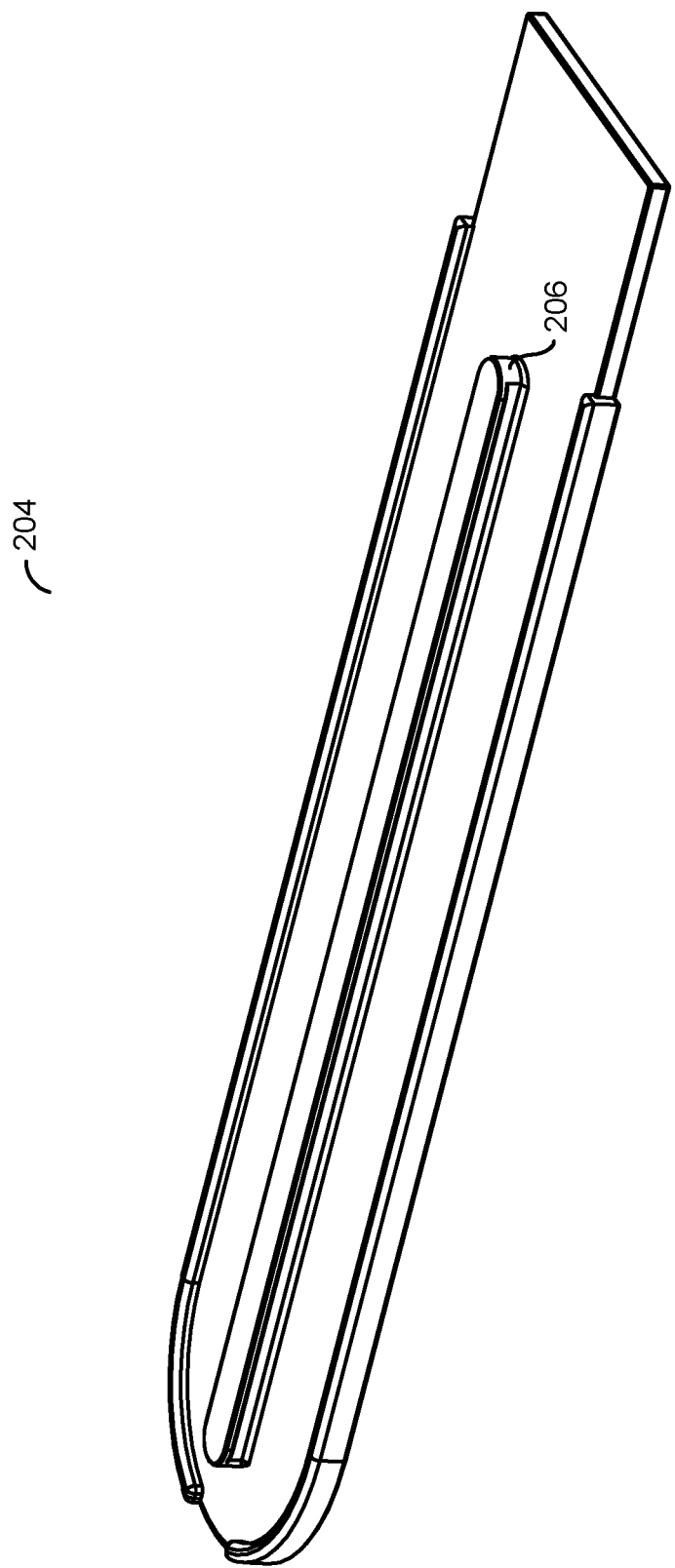
FIG. 7 is a diagram illustrating a ribbed portion of the flexible interlocking closure of FIG. 6.

Referring to FIG. 7, a diagram is shown illustrating a perspective view of the portion 204 and rib feature 206 in accordance with an example embodiment of the invention. In an example, the broadened top and base of the rib feature 206 generally produce a groove running parallel a surface of the portion 204 from which the rib feature 206 extends perpendicularly.

Figure 8:
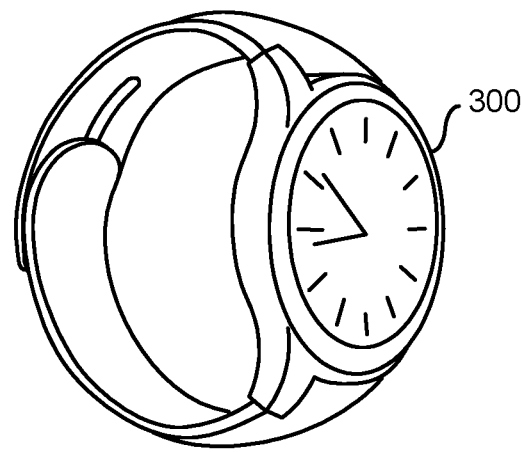
FIG. 8 is a diagram illustrating a wristwatch utilizing a flexible interlocking closure in accordance with an example embodiment of the invention.

Referring to FIG. 8, a diagram is shown illustrating a wristwatch 300 utilizing a flexible interlocking closure in accordance with an example embodiment of the invention. In another example embodiment, a flexible interlocking closure in accordance with an example embodiment of the invention may be utilized as a watchband for the wristwatch 300.

Figure 9A:
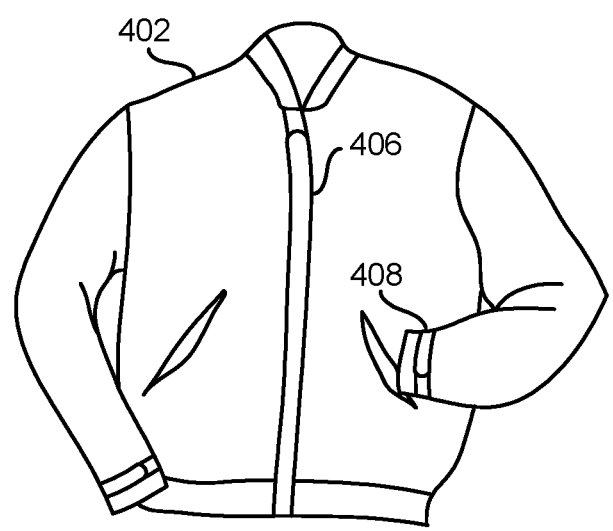
FIG. 9A and FIG. 9B are diagrams illustrating various clothing items utilizing a flexible interlocking closure in accordance with an example embodiment of the invention.

Referring to FIG. 9A, a diagram of a jacket 402 is shown illustrating various clothing items utilizing a flexible interlocking closure in accordance with an example embodiment of the invention. In an example, the jacket 402 is shown illustrating a flexible interlocking closure 406 in accordance with an example embodiment of the invention being utilized in place of buttons or a zipper to close the front opening of the jacket 402. In another example, flexible interlocking closures 408 may be added to the jacket 402 to adjust sleeve cuffs.

Figure 9B:
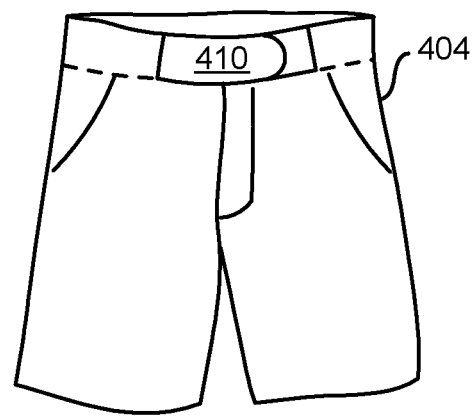

Referring to FIG. 9B, a diagram of a pair of shorts 404 is shown illustrating various clothing items utilizing a flexible interlocking closure in accordance with an example embodiment of the invention. In another example, a flexible interlocking closure 410 in accordance with an example embodiment of the invention may be utilized to provide an adjustable waist band for the shorts 404. Similar to the cap 100, a first end of a first portion of the closure 410 may be attached (e.g., stitched, glued, etc.) to one side of a waistband of the shorts 404 and a first end of a second portion of the closure 410 may be attached (e.g., stitched, glued, etc.) to another side of the waistband of the shorts 404. The two portions of the closure 410 may be fastened together (interlocked) to connect the two sides of the waistband together. The two portions of the closure 410 may be fastened together (interlocked) to form a circumference of continuously variable size over a predetermined range. The closure 410 may allow tightening of the waistband of the shorts 404 without needing to use a belt.

Figure 10A:
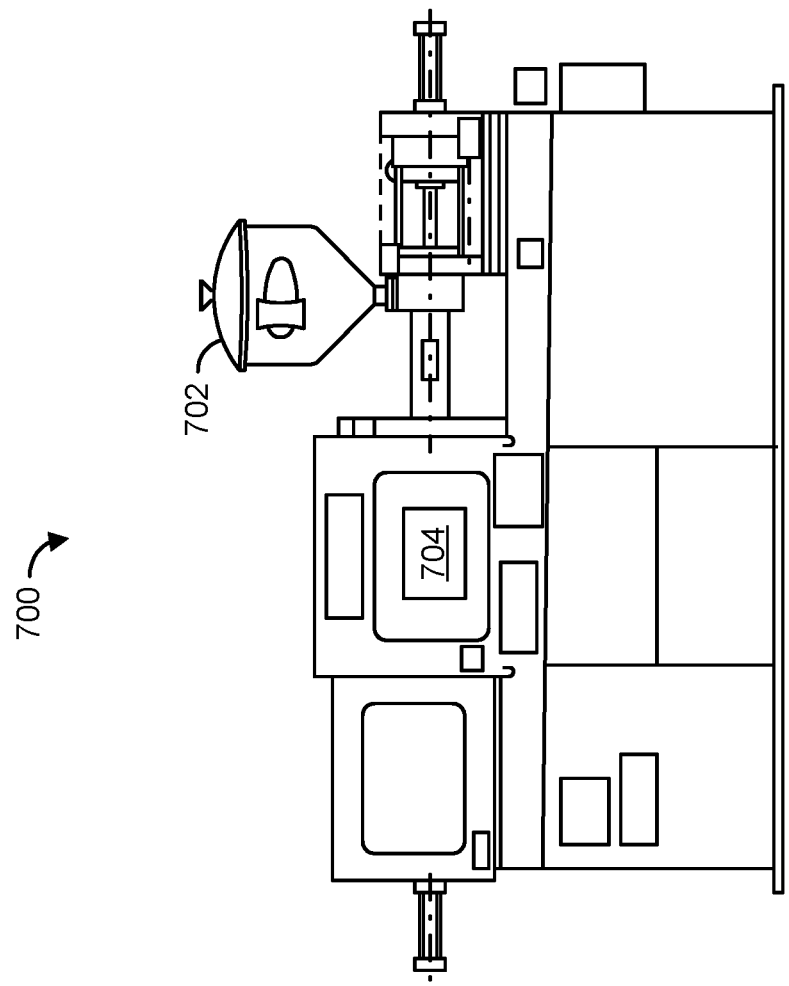
FIG. 10A and FIG. 10B diagrams illustrating an example of an injection molding machine configured to manufacture a flexible interconnecting closure in accordance with an example embodiment of the invention.
Figure 10B:
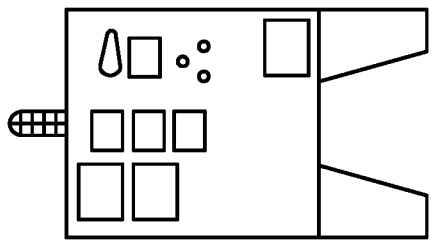

Referring to FIGS. 10A and 10B, diagrams are shown of an injection molding machine 700 illustrating an example process for manufacturing a flexible interlocking closure in accordance with an example embodiment of the invention. In an example, a process (or method) of manufacturing a flexible interlocking closure as described above in connection with FIGS. 2A-2D) may comprise loading resin pellets into a hopper 702 of the injection molding machine 700. In various embodiments, the resin pellets may comprise a moldable plastic material (e.g., polyamide (NYLON), polyester, polybutylene terephthalate (PBT), polypropylene, and polyethylene terephthalate (PET), and/or various alloys and/or fillers of these resins). The injection molding machine 700 may be configured to heat the resin pellets until molten and inject the molten resin into a mold 704. The mold 704 is configured to form molded components of the flexible interlocking closure in accordance with an embodiment of the invention from the molten resin. The injection molding machine 700 cools the mold 704 until the molten resin has set. The molded flexible interlocking closure components in accordance with an example embodiment of the invention may then be removed from the mold and the process repeated.

The mold 704 is generally configured to form the components of at least one molded flexible interlocking closure. In an example embodiment, the molded flexible interlocking closure generally comprises a first portion comprising a channel feature and a second portion comprising a rib feature. The rib feature may be configured to fit within the channel feature. In some embodiments, the mold may be further configured to form an embossed logo in at least one of the two components.

Other methods besides molding may be used to form a flexible interlocking closure in accordance with an embodiment of the invention. For example, techniques exist and are being developed for Producing flexible interlocking closures using three-dimensional (3D) printing. In some embodiments, a flexible interlocking closure in accordance with an embodiment of the invention may be manufactured using such a 3D printing technique.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been Particularly shown and described with reference to embodiments thereof, it will be understood by those skilled in the art that various changes in form and details may be made without departing from the scope of the invention.

The invention claimed is:

1. A strap assembly comprising:
   a first strap portion having a first end, a second end, a first side, and a second side, said first end configured to be attached to an item to be worn, said first side comprising a first substantially smooth, unbroken surface, said second side comprising a second substantially smooth surface and a channel feature, said channel feature comprising two walls extending perpendicularly away from said second substantially smooth surface and running along a first length of said first strap portion from said first end to said second end of said first strap portion, wherein said two walls define sides of a channel running along said first length of said first strap portion and said second substantially smooth surface defines a bottom of said channel running along said first length of said first strap portion; and
   a second strap portion having a third end, a fourth end, a third side, and a fourth side, said third end configured to be attached to said item to be worn, said third side comprising a third substantially smooth, unbroken surface, said fourth side comprising a fourth substantially smooth surface and a rib feature, said rib feature extending perpendicularly away from said fourth substantially smooth surface and running along a second length of said second strap portion from third end to said fourth end of said second strap portion, wherein said rib feature comprises two sides, each side comprising a groove running parallel to said fourth substantially smooth surface along said second length of said second strap portion, said rib feature and said channel feature have substantially the same length along said first length and said second length, respectively, said rib feature is configured to fit within said channel feature, and said first strap portion and said second strap portion are slidably adjustable while said rib feature is within said channel feature to provide a continuous range of circumference for fitting said item to a wearer.

2. The strap assembly according to claim 1, wherein said rib feature and said channel feature are configured to interlock.

3. The strap assembly according to claim 2, wherein said first strap portion and said second strap portion can be slid along said first length and said second length relative to one another while said rib feature and said channel feature remain interlocked.

4. The strap assembly according to claim 1, wherein said channel feature is sufficiently flexible to allow said rib feature to snap inside said channel feature when said first strap portion and said second strap portion are pressed together.

5. The strap assembly according to claim 1, wherein said rib feature comprises a T-shaped cross-section and said channel defines a T-shaped void substantially matching said T-shaped cross-section of said rib feature.

6. The strap assembly according to claim 1, wherein said channel feature defines an hourglass-shaped void and said rib feature comprises a cross-section configured to substantially match said hourglass-shaped void of said channel feature.

7. The strap assembly according to claim 1, wherein said rib feature and said channel feature comprise at least one of a dovetail cross-section or a mushroom-shaped cross-section.

8. The strap assembly according to claim 1, wherein said first strap portion and said second strap portion form a continuously variable circumference over a predetermined range.

9. The strap assembly according to claim 1, wherein said first strap portion and said second strap portion form a continuously adjustable hat band.

10. The strap assembly according to claim 1, wherein said first strap portion and said second strap portion form a continuously adjustable watch band.

11. The strap assembly according to claim 1, wherein said first strap portion and said second strap portion form a closure for an article of clothing.

12. The strap assembly according to claim 1, wherein said strap assembly comprises at least one of polyamide (NYLON), polyester, polybutylene terephthalate (PBT), polypropylene, and polyethylene terephthalate (PET).

13. A continuously adjustable strap assembly comprising:
   a first strap portion having a first end, a second end, a first side, and a second side, said first end configured to be attached to an item to be worn, said first side comprising a first substantially smooth, unbroken surface, said second side comprising a second substantially smooth surface and a channel feature, said channel feature comprising two walls extending perpendicularly away from said second substantially smooth surface and running along a first length of said first strap portion from said first end to said second end of said first strap portion, wherein said two walls define sides of a channel running along said first length of said first strap portion and said second substantially smooth surface defines a bottom of said channel running along said first length of said first strap portion; and
   a second strap portion having a third end, a fourth end, a third side, and a fourth side, said third end configured to be attached to said item to be worn, said third side comprising a third substantially smooth, unbroken surface, said fourth side comprising a fourth substantially smooth surface and a rib feature, said rib feature extending perpendicularly away from said fourth substantially smooth surface and running along a second length of said second strap portion from said third end to said fourth end of said second strap portion, wherein said rib feature comprises two sides, each side comprising a groove running parallel to said fourth substantially smooth surface along said second length of said second strap portion, said rib feature and said channel feature have substantially the same length along said first length and said second length, respectively, said rib feature is configured to fit within said channel feature, said first strap portion and said second strap portion are slidably adjustable while said rib feature is within said channel feature to provide a continuous range of circumference for fitting said item to a wearer, and said rib feature and said channel feature comprise at least one of a dovetail cross-section, an hourglass-shaped cross-section, or a mushroom-shaped cross-section.

14. The continuously adjustable strap assembly according to claim 13, wherein said continuously adjustable strap assembly is configured as an adjustable headband of a hat.

15. The continuously adjustable strap assembly according to claim 13, wherein said continuously adjustable strap assembly is configured as an adjustable headband of a baseball cap.

16. The continuously adjustable strap assembly according to claim 13, wherein said continuously adjustable strap assembly comprises at least one of polyamide (NYLON), polyester, polybutylene terephthalate (PBT), polypropylene, and polyethylene terephthalate (PET).

17. The continuously adjustable strap assembly according to claim 13, wherein said continuously adjustable strap assembly is configured as an adjustable watch band.

18. A method of manufacturing a flexible strap assembly comprising:
  loading resin pellets into a hopper of an injection molding machine containing a mold configured to form at least one set of components of said flexible strap assembly, wherein
    (i) a first component of said flexible strap assembly includes a first side comprising a first substantially smooth, unbroken surface and a second side comprising a second substantially smooth surface and a channel feature, said channel feature comprising two walls extending perpendicularly away from said second substantially smooth surface and running along a first length of said first component from a first end of said first component to a second end of said first component, said two walls defining sides of a channel running along said first length of said first component and said second substantially smooth surface defining a bottom of said channel running along said first length of said first component, said first end configured to be attached to an item to be worn, and
    (ii) a second component of said flexible strap assembly includes a third side comprising a third substantially smooth, unbroken surface and a fourth side comprising a fourth substantially smooth surface and a rib feature, said rib feature extending perpendicularly away from said fourth substantially smooth surface and running along a second length of said second component a second distance from a third end of said second component to a fourth end of said second component, said rib feature comprising two sides, each side comprising a groove running parallel to said fourth substantially smooth surface along said second length of said second component, said third end configured to be attached to said item to be worn, said rib feature and said channel feature having substantially the same length along said first length and said second length, respectively, said rib feature being configured to fit within said channel feature, and said first component and said second component being slidably adjustable while said rib feature is within said channel feature to provide a continuous range of circumference for fitting said item to a wearer;
  heating the resin pellets to obtain a molten resin;
  injecting the molten resin into the mold; and
  cooling the mold until the molten resin has set.

19. The method of manufacturing said flexible strap assembly according to claim 18, wherein said resin pellets comprise at least one of polyamide (NYLON), polyester, polybutylene terephthalate (PBT), polypropylene, and polyethylene terephthalate (PET).

* * * * *